United States Patent [19]

Horanoff

[11] 3,866,467

[45] Feb. 18, 1975

[54] WIND TUNNEL MODEL SUPPORT AND MEASURING SYSTEM WITH THREE-DEGREES-OF-FREEDOM

[75] Inventor: Eugene V. Horanoff, Clarksville, Md.

[73] Assignee: The United States of America as represented by the Secretary of the Navy, Washington, D.C.

[22] Filed: Feb. 20, 1973

[21] Appl. No.: 333,914

[52] U.S. Cl. .................................... 73/147, 356/138
[51] Int. Cl. ............................................. G01m 9/00
[58] Field of Search ........... 73/147; 308/9; 356/138, 356/141, 147, 172, 152; 350/96 R, 96 B; 33/1 PT, 125 A, 125 C; 250/231 SE

[56] References Cited
UNITED STATES PATENTS

| | | | |
|---|---|---|---|
| 2,869,901 | 1/1959 | Czwerwinski | 73/147 |
| 3,173,299 | 3/1965 | Peterson | 308/9 |
| 3,399,347 | 8/1968 | Martens | 250/231 SE |
| 3,455,155 | 7/1969 | Greenberg | 73/147 |
| 3,583,815 | 6/1971 | Kersey | 73/147 |

*Primary Examiner*—Richard C. Queisser
*Assistant Examiner*—Denis E. Corr
*Attorney, Agent, or Firm*—R. S. Sciascia; J. A. Cooke

[57] ABSTRACT

A wind tunnel model support and a spherical air bearing with three-degrees-of-freedom having optical readout of angles of pitch, yaw, and roll of an aerodynamic model. The readout system uses a plurality of fiber-optics light guides, spaced 1° apart for each of the axes of rotation at the air bearing, which conduct the light to photo-electric pickups at the other ends at a remote site. A light source illuminates the light guides at the air bearing and movable masks, connected to the model, occults the light beam to successive light guides. The output of each photo-electric pickup thereby indicates the angle of rotation of the model.

6 Claims, 1 Drawing Figure

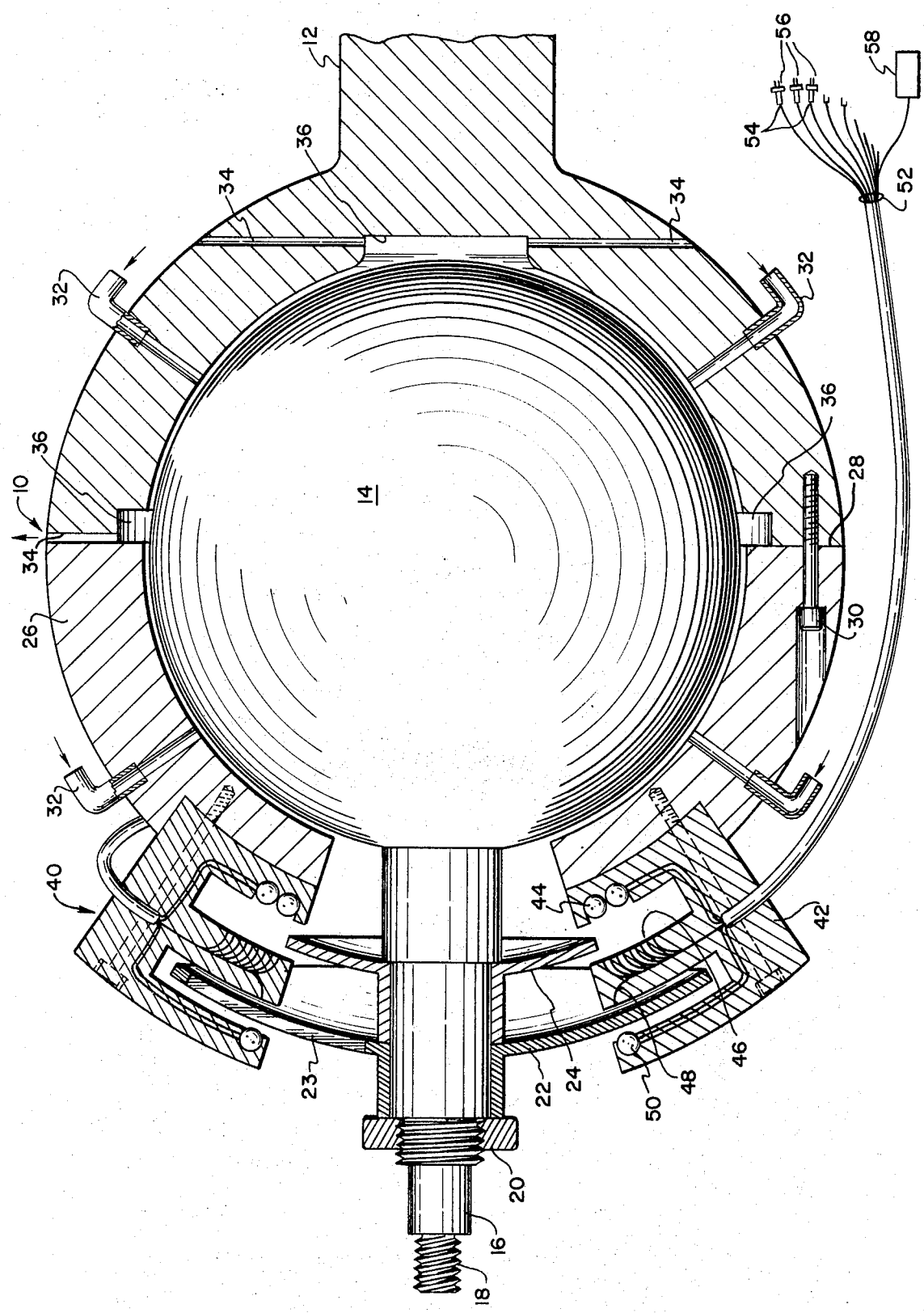

WIND TUNNEL MODEL SUPPORT AND MEASURING SYSTEM WITH THREE-DEGREES-OF-FREEDOM

BACKGROUND OF THE INVENTION

The instant invention relates generally to wind tunnel model supports and more particularly to a model support having three-degrees-of-freedom and measurement capability using optical light-guide means.

In wind tunnel model testing, the model must be supported at the proper place in the air stream and its aerodynamic characteristics either visually observed or otherwise measured. Preferably the model should be unrestrained in the motion direction desired to be measured, such as pitch, yaw, and roll, so that other forces do not influence the measurement of observation.

A problem with existing supports used, particularly when measurements are to be made, is that the model is not unrestrained and generally held with flexure members. Strain gauges attached to the flexure members provide sensing of the force components which can be transmitted to a location outside the wind tunnel. Additionally the flexure-strain gauge arrangement provides inaccurate measurements because of uneven heating and the different coefficients of expansion of the various parts.

One of the earliest methods of measurement of the components of force and moments on a test model was an actual balance scale built outside the wind tunnel proximate the test section and connected to the model. But these balances were expensive and designed on a compromise basis as multi-purpose devices for average model testing requirements. Being large and massive, these balances suffer from low natural frequencies, resulting in low response rates.

Another type of model support and measuring device, well-known for wind tunnel testing, is the sting, mounted internally of the model on a strut projecting from a wall of the tunnel. This type is more compact but suffers from the effects of high flexibility, causing low frequency response and inaccuracy caused by sensitivity to load components other than those to be measured.

Another problem associated with wind tunnel model testing is the means to measure the force components. Observation of the model through windows is not feasible in supersonic, short-lived testing, and flexure members and strain gauges are not reliable or accurate because of temperature variations. And while the suggested use of air bearings provides unrestrained support of a model, as yet no feasible means of measuring the force components has been devised.

SUMMARY OF THE INVENTION

Accordingly, an object of the present invention is to provide a new and improved wind tunnel model support and aerodynamic force measuring device.

Another object of the instant invention is to provide a model support and force measuring device having three-degrees-of-freedom motion capability.

Still another object of the present invention is to provide reliable and accurate measurement of wind tunnel model aerodynamic force components.

A further object of the instant invention is to provide a wind tunnel model support and measuring device having remote readout capability.

A still further object of the instant invention is to provide a wind tunnel model support having unrestrained rotational motion capability.

Another object of the present invention is to provide a wind tunnel model support and measuring device capable of withstanding supersonic air flow without deliterious effects due to heat.

Briefly, these and other objects of the present invention are attained by the use of a wind tunnel model support and measuring device having a spherical air bearing providing unrestrained rotational movement with three-degrees-of-freedom. The model is supported on a shaft or sting attached to a solid sphere riding on a cushion of air in a socket member affixed in a wind tunnel. The sphere and the model are therefore free to pitch and yaw a limited amount and to roll with no limitation. The measurement and readout system comprises a plurality of fiberoptic light guides spaced 1° apart along each axis of rotation, the first ends of which are stationary and illuminated by a light at the air bearing end, and conduct the light to the second ends some distances away from the model. Photo-electric pick ups at the second ends sense the presence of light in each light guide. Attached to the movable sphere is a mask interposed between the light and the first ends of the light guides for the pitch and yaw axes and another mask having a slit interposed between the light and the light guide for the roll axis. As the model pitches and yaws the sharp edge of the pitch-yaw mask occults the light from each successive light guide and the photoelectric pick up at its end is triggered. A new photoelectric pickup is triggered for each 1° of motion. The roll orientation, or alternatively, the speed of rotation, is determined by a similar method.

BRIEF DESCRIPTION OF THE DRAWINGS

A more complete understanding of the invention and many of the attendant advantages thereof will be readily appreciated as the same become better understood by reference to the following detailed description when considered in connection with the accompanying drawing wherein the single Figure is a cross-sectioned view of the spherical air bearing support measurement, and readout system.

DESCRIPTION OF THE PREFERRED EMBODIMENT

Referring now to the drawing, there is shown generally in the Figure a spherical air bearing 10 mounted on a conventional wind tunnel sting support 12. The spherical air bearing comprises a sphere 14 having a model mount 16, consisting of a cylindrical protuberance extending from the sphere with a threaded end portion 18 adapted to secure a model. Intermediate the threaded end 18 and the sphere 14 is a nut 20 threadedly engaged on the model mount 16 and retaining a roll mask 22 and a pitch-yaw mask 24 on the cylindrical protuberance. These masks will be described in detail hereinafter.

Spherical air bearing 10 also comprises a socket 26 in which the sphere 14 rides on a cushion of air or air film, made of two half-shells joined at a meridian 28 by any conventional manner such as screw fasteners 30 (only one shown). One of the half-shells is connected to the sting support 12. Surrounding the outside of the socket 26 is a plurality of air intake ports 32 (only four shown) communicating through the socket to the air space between the sphere 14 and the socket 26. The external portion of the air intake ports 32 may be manifolded together and connected to a source of air pressure. Also surrounding the socket 26 is a plurality of air exhaust ports 34 communicating with a plurality of distribution channels 36 formed on the inside surface of the spherical socket.

Referring now particularly to the optical measuring and readout system 40, the details of which are shown in the Figure, there are E-shaped brackets 42 (two of four shown) secured to the socket 26 and spaced at 90° intervals around the open portion through which model mount 16 extends. The lower leg of the E contains a light-source 44, such as pilot lights or the like, mounted to illuminate the center leg of the E. The lower side of the center leg contains a plurality of fiber optic light guides 46, the ends directed toward the lower leg and arranged in a row along a pitch axis and a yaw axis, spaced one angular degree apart. The upper side of the center leg contains a fiber optic light guide 48 for roll determination with its end directed toward the upper leg of the E-shaped bracket. The upper leg contains a light source 50 illuminating the light guide 48.

As mentioned hereinbefore, the model mount 16 attached to the movable sphere 14 carries a roll mask 22 and a pitch-yaw mask 24. The circular masks 22 and 24 are made of thin sheet material formed with a central collar tightly secured to the model mount, and have an extending spherical contoured skirt. The roll mask has a narrow slit 23 in the skirt and is interleaved between the light source 50 in the upper leg of the E-shaped bracket 42 and the light guide 48 of the center leg. The pitch-yaw mask 24, having no-slit and mounted internally of the roll mask, is interleaved between the plurality of light guides ends 46 in the lower side of the center leg of the E-shaped bracket and the light source 44 in the lower leg.

The fiber optic light guides 46 and 48, and the conductors for light sources 44 and 50 are bundled together in a cable 52 and lead away to a remote recording site where the cable 52 is separated into individual fiber optic ends 54, each coupled to a photo-electric pickup 56. The conductors for the light sources are separated from the cable and connected to a power source 58.

In operation, the spherical air bearing 10 is secured by the socket 26 to the wind tunnel sting support 12 which is securely mounted in the throat of a wind tunnel. As aerodynamic model is threadedly engaged to the model mount 16 at the threaded end portion 18. This model mount protuberance is integral with the movable sphere 14.

A source of pressurized air is supplied to the plurality of air intake ports 32 on the socket 26 where the air flow disperses and distributes throughout the air space between the sphere 14 and the socket 26 to form an air film to cushion the sphere in a stable, frictionless relation to the socket. The air flow is then further distributed in the distribution channels 36 and directed to the air exhaust ports 34 to the surrounding environment of the wind tunnel.

Referring to the optical measuring and readout system 40, a power source 58 supplies current via conductors in cable 52 to illuminate the light sources 44 and 50 contained in the E-shaped brackets 42. These light sources, located on the insides of the upper and lower legs of the E, normally illuminate all the ends of the fiber optic light guides positioned in both sides of the center leg of the E. The pitch-yaw mask 24, affixed to the model mount 16, is shown in its neutral position interleaved between the center and lower leg of the E-shaped bracket and not occulting the light beam from the light source 44 to the light guides 46. As the model, and therefore the mask, move in pitch or yaw, the mask occults each light guide for each one degree of movement. When the light beam is thus obscured from the light guide, the photoelectric pickup 56 at the remote end 54 of the cable 52 becomes dark thus indicating that the model has pitched or yawed 1°. It is to be understood that four E-shaped brackets 42 exist, two on the x axis for yaw measurement and two on the y axis for pitch measurement.

The roll mask 22 affixed to the model mount 16 is shown interleaved between the upper and center leg of the E-shaped bracket 42 and occulting the light beam from the light source 50 to the light guide 48. As the model and therefore the mask rotates on the roll axis, the slit 23 in its skirt, as it passes the light beam, permits light to impinge on the light guide 48. The presence of light carried by the light guide is sensed at the remote end 54 of the cable 52 by the photoelectric pickup 56, indicating that the model has rolled 90°. Alternatively, the rotation rate may be indicated. it is to be understood that four such light sources 50 and light guides 48 exist, two on the x axis and two on the y axis.

Obviously, many modifications and variations of the present invention are possible in light of the above teachings. It is therefore to be understood that within the scope of the appended claims, the invention may be practiced otherwise than as specifically described.

What is claimed as new and desired to be secured by Letters Patent of the United States is:

1. A wind tunnel model support and scale having three-degrees-of-freedom comprising:

a socket attached to a sting support in the wind tunnel;

a sphere connectable to a model and rotatably receivable within said socket;

an air film between said socket and said sphere to permit frictionless relative movement; and a fiber optic measuring system coupled to said socket and said sphere for indicating displacements of said model, including:

a light source affixed to said socket adjacent said sphere and located on each of the pitch and yaw axes;

a plurality of light guides having one end of each capable of illumination by said light source; and a plurality of photoelectric pickups, one in proximity to each of the other ends of said plurality of light guides for indicating the presence of light in said light guides, whereby movements of said model relative to the pitch, yaw, and roll axes are sensed and transmitted to a position outside the wind tunnel.

2. The wind tunnel model support and scale of claim 1 further comprising:

an opaque pitch and yaw mask attached to said movable sphere and interposed between said light source and said plurality of light guides for successively occulting the light beam.

3. The wind tunnel model support and scale of claim 2 wherein said plurality of light guides are arranged along the pitch and yaw axes in one angular degree increments.

4. The wind tunnel model support and scale of claim 1 further comprising:
a second light source affixed to said socket and adjacent said sphere on each of the cardinal points of the pitch and yaw axes;
another light guide having one end capable of illumination from said second light source;
an opaque roll mask having a narrow slit attached to said movable sphere and interposed between said another light source and said another light guide; and
a photoelectric pickup in proximity to each of the other ends of said light guides for indicating the presence of light in said light guide at each one-fourth revolution of said slit in said roll mask.

5. The wind tunnel model support and scale of claim 4 wherein
said masks are substantially disc-shaped and have a spherical contour.

6. The wind tunnel model support and scale of claim 5 further comprising:
a source of power connected to said light sources; and
a source of pressurized air connected to said socket for supplying said air film.

* * * * *